United States Patent
Neumann (10) Patent No.: US 6,573,621 B2
(45) Date of Patent: Jun. 3, 2003

(54) AC/DC POWER SUPPLY SYSTEM FOR POWER TOOLS

(75) Inventor: Peter W. Neumann, Chicago, IL (US)

(73) Assignee: S-B Power Tool Company, Chicago, IL (US)

( * ) Notice: Subject to any disclaimer, the term of this patent is extended or adjusted under 35 U.S.C. 154(b) by 110 days.

(21) Appl. No.: 09/727,664

(22) Filed: Dec. 1, 2000

(65) Prior Publication Data

US 2002/0067080 A1 Jun. 6, 2002

(51) Int. Cl.[7] ................................................. H02J 7/00
(52) U.S. Cl. ........................ 307/150; 307/80; 320/114; 439/188
(58) Field of Search ................................ 307/126, 150, 307/80; 320/114; 439/188

(56) References Cited

U.S. PATENT DOCUMENTS

| | | | |
|---|---|---|---|
| 2,867,039 A | 1/1959 | Zäch | 30/43 |
| 3,379,952 A | 4/1968 | Tarrson | 320/2 |
| 3,525,912 A | 8/1970 | Wallin | 318/17 |
| 4,620,110 A * | 10/1986 | Cooney | 307/150 |
| 5,159,256 A | 10/1992 | Mattinger et al. | 320/2 |
| 5,191,277 A | 3/1993 | Ishikura et al. | 320/22 |
| 5,233,230 A * | 8/1993 | Bonar | 307/64 |
| 5,331,212 A * | 7/1994 | Johnson-Williams et al. | 307/150 |
| 5,489,807 A | 2/1996 | Sanjuan et al. | 307/66 |
| 5,592,030 A * | 1/1997 | Adahan | 307/128 |
| 5,629,602 A | 5/1997 | Makino | 320/6 |
| 5,715,156 A * | 2/1998 | Yilmaz et al. | 307/26 |
| 5,783,927 A * | 7/1998 | Chen | 320/110 |
| 5,847,541 A * | 12/1998 | Hahn | 320/111 |
| 6,104,162 A * | 8/2000 | Sainsbury et al. | 320/107 |
| 6,160,378 A * | 12/2000 | Helot et al. | 320/113 |
| 6,163,086 A * | 12/2000 | Choo | 307/43 |
| 6,169,384 B1 * | 1/2001 | Shannon | 307/66 |
| 6,243,276 B1 * | 6/2001 | Neumann | 323/901 |
| 6,296,065 B1 * | 10/2001 | Carrier | 173/171 |

* cited by examiner

Primary Examiner—Brian Sircus
Assistant Examiner—Sharon A. Polk
(74) Attorney, Agent, or Firm—Greer, Burns & Crain, Ltd.

(57) ABSTRACT

A power supply for a power tool which is adapted to be powered by a battery source and an AC voltage source includes a battery module constructed and adapted to be removably coupled to the power tool. The battery module includes a battery pack for supplying power to the power tool. A power converter module supplies current for charging the battery pack and for operating the power tool. A power plug extends from the power converter module and is adapted to be connected to the battery module. The power plug has a first output for supplying the tool operating current to the power tool and a second output for supplying the battery charging current to the battery pack when the plug is connected to the battery module. A switching device is provided in the battery module for electrically disconnecting the battery pack from the power tool responsive to the plug being connected to the battery module.

20 Claims, 7 Drawing Sheets

AC/DC POWER SUPPLY SYSTEM FOR POWER TOOLS

The present invention generally relates to a power supply system for corded/cordless power operated devices, and more particularly to a power supply system for an AC/DC power tool that automatically switches from battery power to corded DC power without having to remove the battery pack from the power tool.

Hand-held power tools equipped both with a battery pack and a corded DC power pack (e.g., an AC to DC power converter) are well known. The battery pack allows the operator to utilize the tool in places where AC power might not be available, or where the cord from a corded DC power pack might hinder the operator from using the tool effectively, for example. The corded DC power pack, on the other hand, allows the operator to use the tool when the charge on the battery pack is low or has depleted. When that happens, the depleted battery pack would be detached from the tool and the corded DC power pack attached in its place.

A problem associated with the conventional battery/corded DC power system is that the battery pack must be removed before the corded DC power pack can be used. In addition to being an inconvenience, the battery pack can become lost when separated from the tool. Further, in the battery/corded DC power system, a separate battery charger is typically required to charge the battery pack. A battery charger may or may not be provided by the manufacturer of the power tool. In any case, the operator generally bears the cost of the battery charger.

Accordingly, it is a primary objective of the present invention to provide an improved power supply system for an AC/DC power tool.

Another object of the present invention is to provide an improved power supply system which is adapted to switch from battery power to corded DC power without having to remove the battery pack from the power tool.

Yet another object of the present invention is to provide such an improved power supply system which automatically charges the battery pack while supplying power to the tool.

Still another object of the present invention is to provide such an improved power supply system having a switch which electrically disconnects the battery pack from the power tool an instant the corded DC power pack is connected to the power tool.

A further object of the present invention is to provide such an improved power supply system which prevents an over-voltage condition on and damaging the battery pack.

Other objects and advantages will become apparent upon reading the following detailed description, in conjunction with the attached drawings, in which:

DETAILED DESCRIPTION

The present invention is directed to a power supply system for power tools, and includes a battery pack module and an AC to DC power converter module. The power converter module is adapted to be connected to the battery pack module, so that power to the tool can be supplied directly by the power converter module without having to remove the battery pack module from the tool. The battery pack module includes a switch which is activated when the power converter module is connected thereto. When activated, the switch electrically disconnects the battery power from the tool, and immediately thereafter, allows the power converter module to supply power to the tool and the battery pack inside the battery pack module. In this manner, the converter module powers the tool and simultaneously charges the battery pack. The task of supplying power to the tool is automatically turned over to the battery pack when the power converter module is disconnected from the battery pack module and the switch deactivated.

Broadly stated, the present invention is directed to a power supply system for power tools that are adapted to be powered by a battery source and an AC voltage source. The power supply system includes a battery module constructed and adapted to be removably coupled to the power tool. The battery module includes a battery pack for supplying power to the power tool. A power converter module outputs current for charging the battery pack and for operating the power tool. A power plug for outputting current from the power converter module is adapted to be connected to the battery module. The power plug has a first output that supplies the operating current to the power tool and a second output that supplies the battery charging current to the battery pack, when the plug is connected to the battery module. A switching device is provided in the battery module for electrically disconnecting the battery pack from the power tool when activated responsive to the power plug being connected to the battery module.

Figure 1:
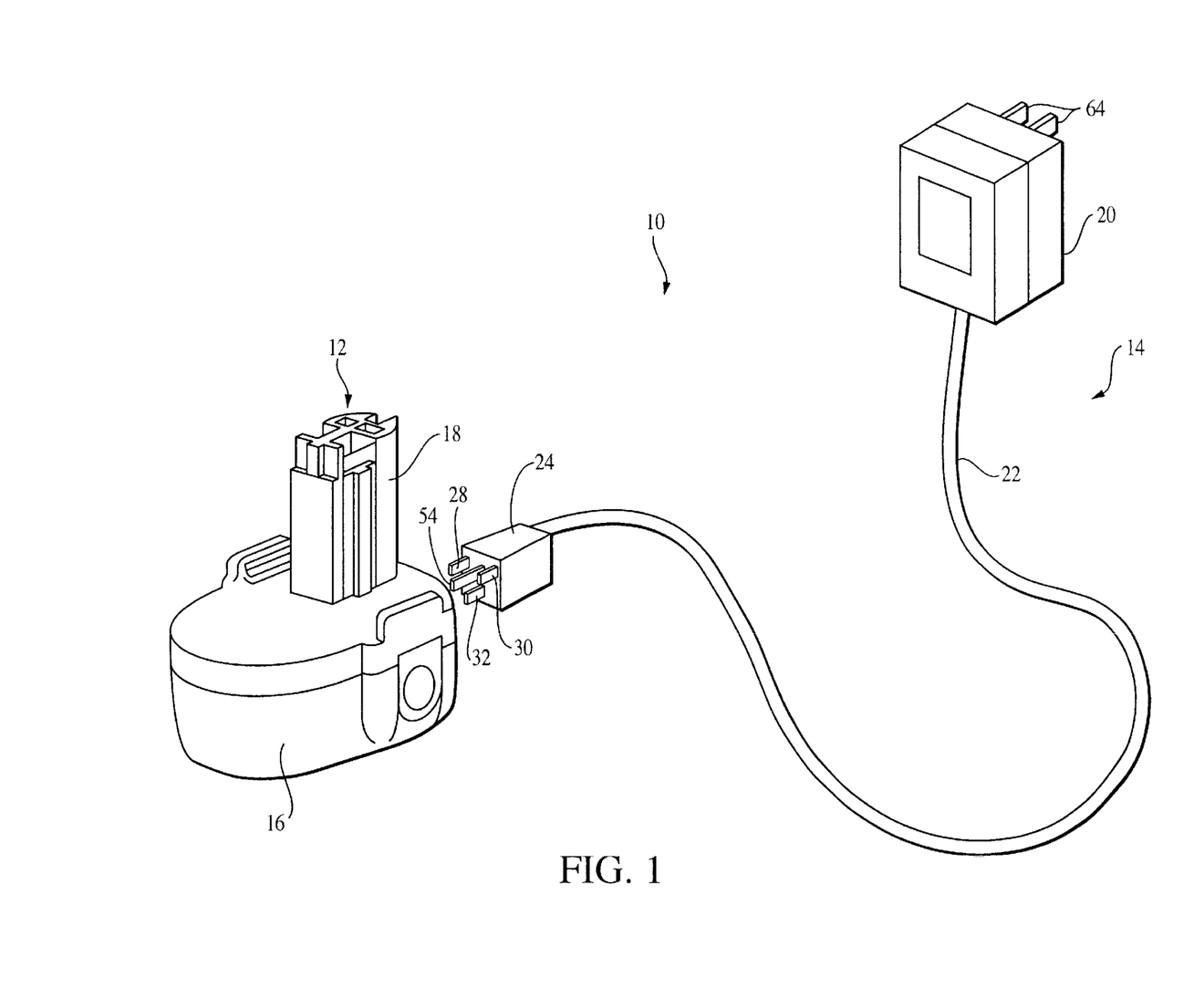
FIG. 1 is a perspective view of a power supply system embodying the present invention.

Turning now to FIG. 1, the power supply system of the present invention is indicated generally at 10, and includes a battery pack module 12 and an AC to DC power converter module 14. The battery pack module 12 includes a housing 16 for holding a battery pack (not shown) and a connection portion 18 which is configured and adapted to be inserted into a receiving chamber of a power tool (not shown), typically, the handle of the tool. The power converter module 14 includes a converter unit 20 for converting AC power to DC, and a power cable 22 extending from to the converter unit for carrying the converted DC power to a plug 24, which is constructed and adapted to be plugged into the housing 16 of the battery pack module 12.

Figure 2:
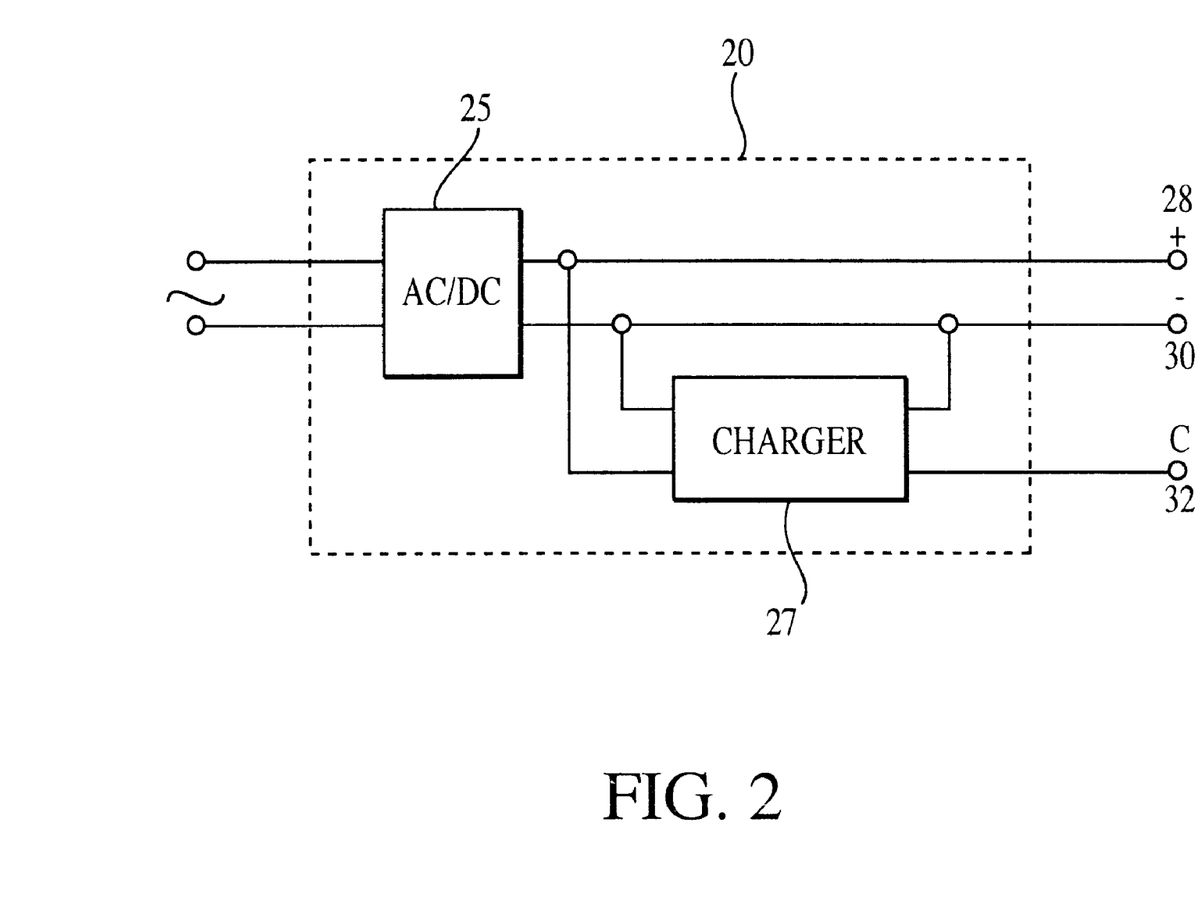
FIG. 2 is a block diagram of a converter unit shown in FIG. 1.
Figure 3:
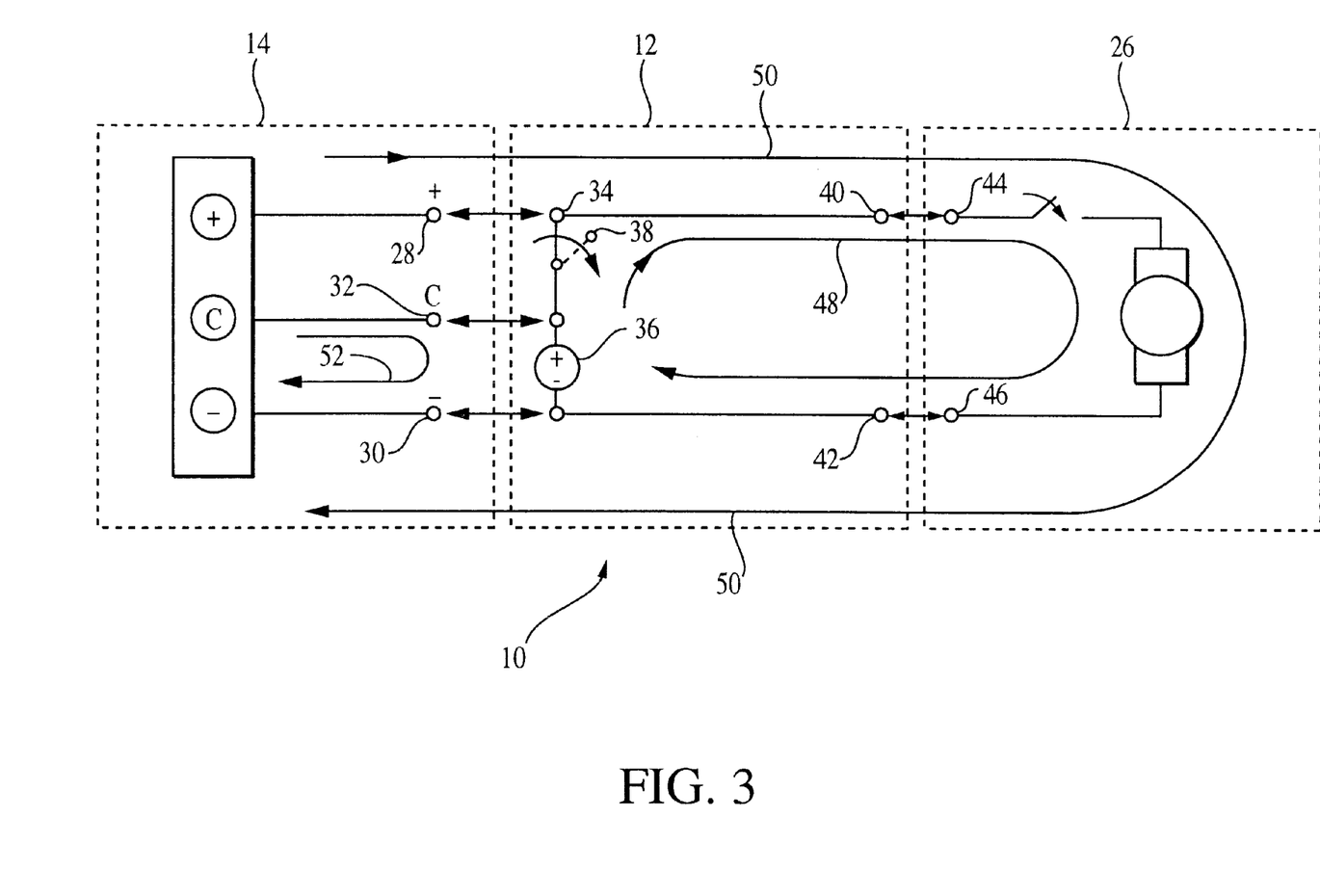
FIG. 3 is a circuit diagram of the power supply system of the present invention.

Turning to FIGS. 2 and 3, the converter unit 20 includes an AC to DC power rectifier 25 and a battery charger 27. The rectifier 25 converts AC input power to DC and sends it to a positive output 28, and the charger 27 supplies current to a charging output 32. The rectifier 25 and the battery charger 27 share a common negative output 30.

The positive output 28 is adapted to be electrically connected to a connection node 34, which when not connected to the positive output, is electrically connected to the positive side of a battery pack 36 provided in the battery pack module via a switch 38. The negative output 30 is adapted to be electrically connected to the negative side of the battery pack 36, and the charging output 32 to the positive side of the battery pack 36. The battery pack module 12 has a positive output 40 which is electrically connected to the connection node 34, and a negative output 42 which is electrically connected to the negative side of the battery pack 36. The outputs 40, 42 are adapted to be respectively connected to a positive and a negative input 44, 46 of the power tool 26 when the connection portion 18 of the battery pack module 12 (shown in FIG. 1) is inserted into the receiving chamber (not shown) of the power tool 26.

When the power converter module 14 is not connected to the battery pack module 12, the switch 38 is in a deactivated or normally-closed state, which connects the positive side of the battery pack 36 to the connection node 34. In this condition, power is supplied to the power tool 26 by the battery pack 36, for example, ni-cd batteries, and flows in the direction indicated by a circuit path 48.

When the power converter module 14 is connected to the battery pack module 12, the outputs 28, 30, 32 of the converter module electrically connect to the battery pack module in the manner described above. Also, the switch 38 activates or opens, so that the positive side of the battery pack 36 disconnects from the connection node 38. As a result, the circuit path 48 is opened. An instant after the switch 38 is activated, the positive output 28 of the power converter module 14 connects to the connection node 34, thereby forming an alternate current path 50 which carries current from the rectifier 25 to the power tool 26. At this time, the battery pack 36 is charged by the charger 27 through the charging output 32. The battery charger 27 is adapted to generate a charging current particularly suitable for the type of battery pack 36 being used. The negative output 30 connects to the negative side of the battery pack 36. The flow of charge current to the battery pack 36 is illustrated by a current path 52.

Figure 4:
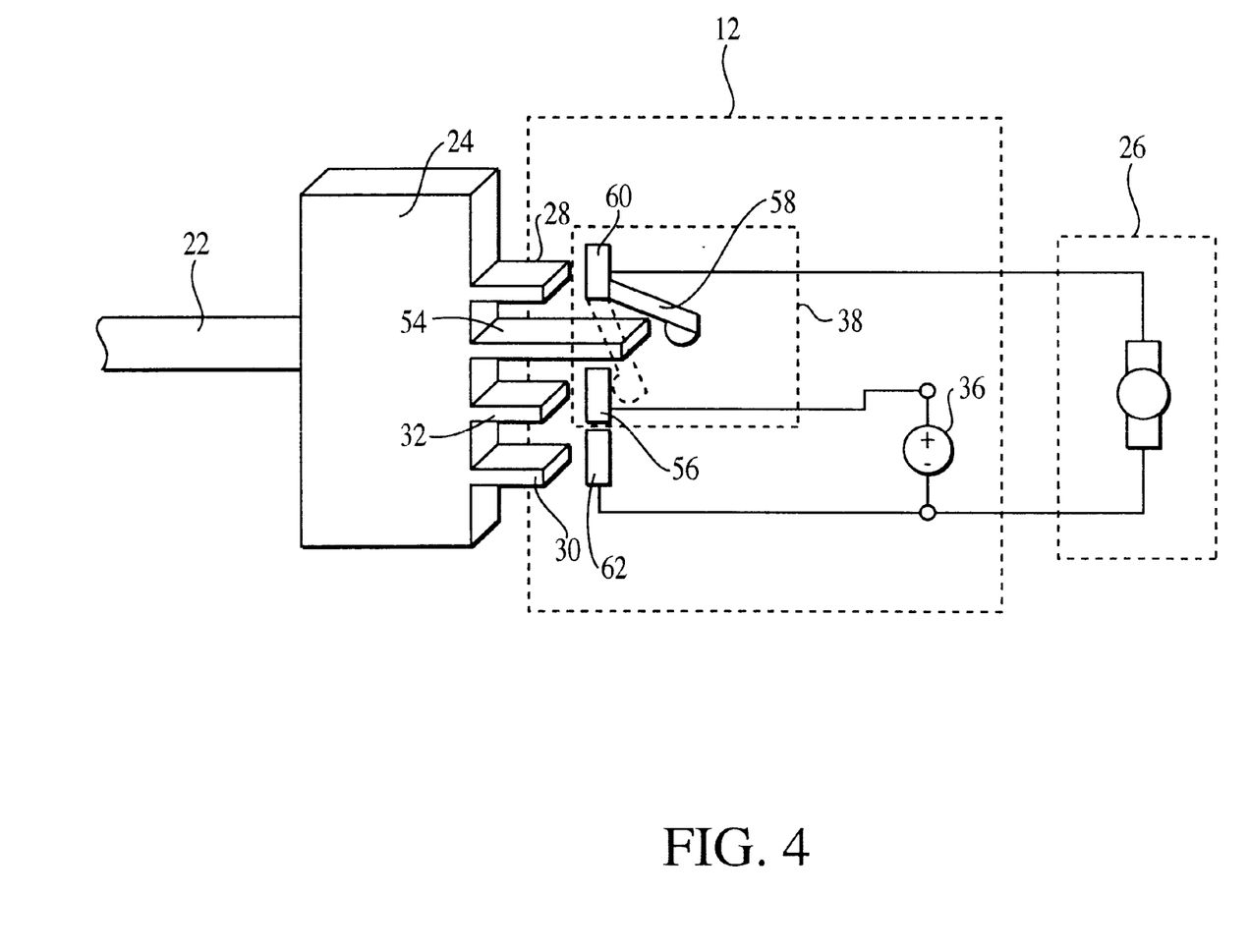
FIG. 4 is a diagram illustrating the operation of a switch in accordance with one embodiment of the present invention.

Turning now to FIG. 4, the plug 24 includes a switch prong 54 in addition to the three prongs for the positive, the negative and the charging outputs 28, 30, 32. As shown in FIG. 4, the length of the switch prong 54 is longer than those of the outputs 28, 30, 32, and particularly, that of the positive output 28. Having this configuration, the switch prong 54 activates the switch 38 by biasing a spring arm 58 away from a positive terminal 56 of the battery pack 36 before the prongs for any of the outputs 28, 30, 32 make contact with their respective electrical terminals 60, 56, 62, mechanically and electrically, when the plug 24 is inserted into the battery pack module 12.

In this manner, the battery pack 36 becomes electrically disconnected from the power tool 26 an instant before the prong for the positive output 28 makes contact with the terminal 60, which is electrically connected to the power tool 26. Thus, the switch prong 54 acts as a safeguard against both the positive output 28 and the charging output 32 being simultaneously connected to the battery pack 36, and creating an over-voltage condition which may damage the battery pack.

When the plug 24 is disconnected from the battery pack module 12, the switch 38 is deactivated, causing the spring arm 58 to return to its normally-closed position where it is in electrical contact with the positive terminal 56 of the battery pack 36, as shown in dotted line. Disconnecting the plug 24 automatically reconnects the positive terminal 56 of the battery pack 36 with the power tool 26.

Figure 5:
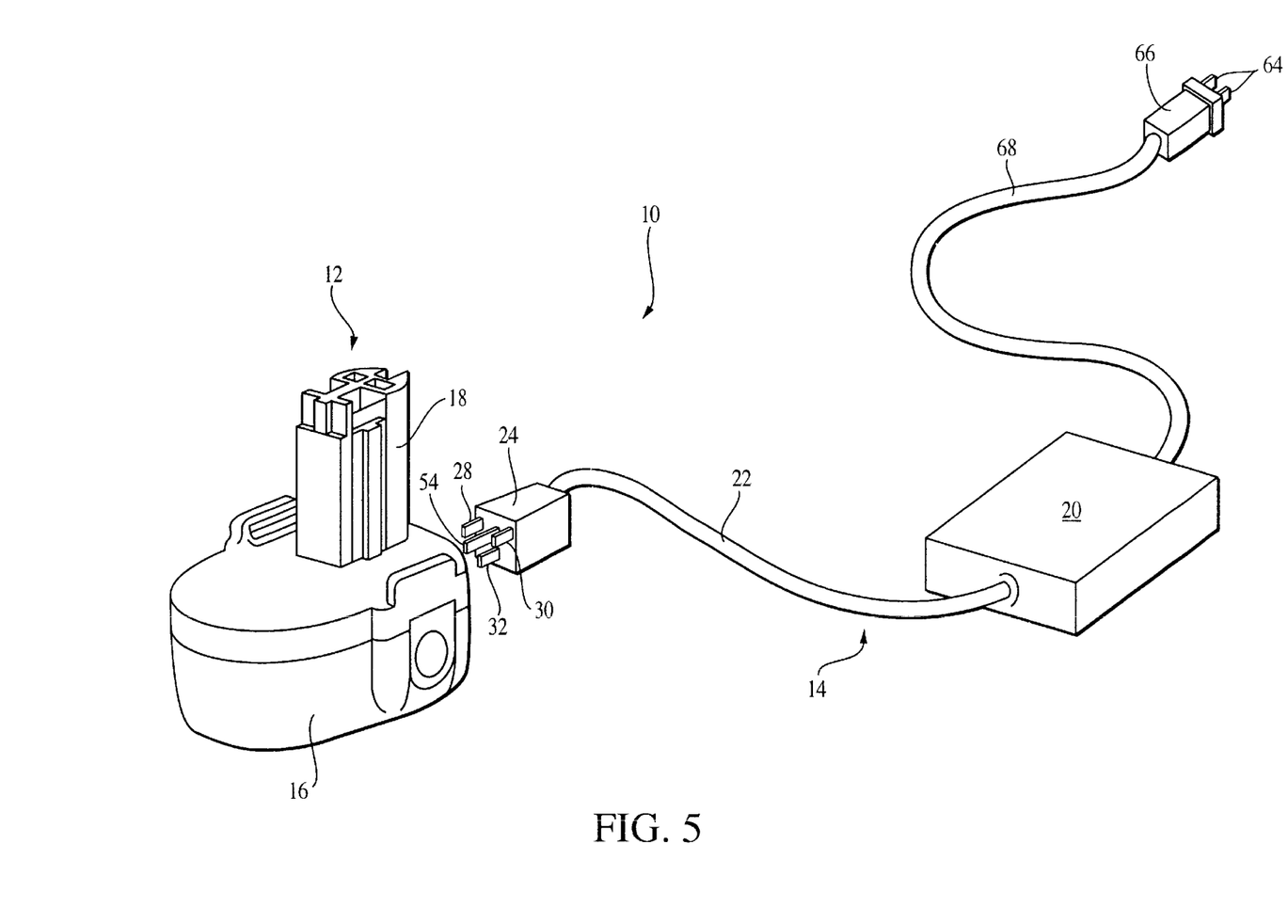
FIG. 5 is a perspective view of an alternate embodiment of an AC to DC converter unit shown in FIG. 1.
Figure 6:
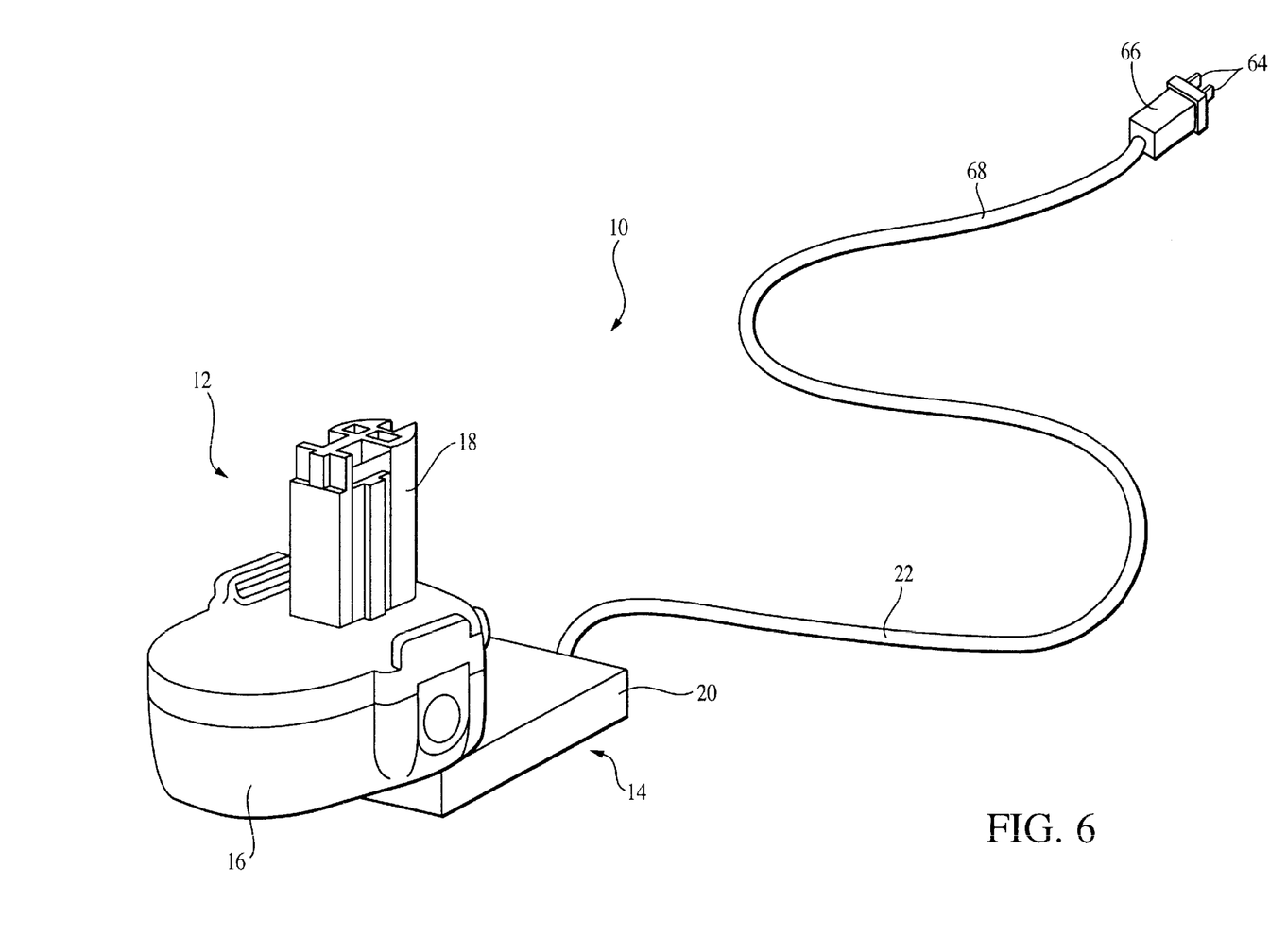
FIG. 6 is a perspective view of another alternate embodiment of the AC to DC converter unit shown in FIG. 1; and, FIG. 7 is a circuit diagram showing an alternate embodiment of the operation of the switch shown in FIG. 4.

In FIG. 4, the plug 24 is shown with all four prongs in line with respect to each other. It should be understood, however, that this is only one arrangement of the prongs of the plug 24, and that they maybe configured in other ways, for example, as shown in FIG. 1. Also, there are different ways in which the power converter unit 14 may be configured. For example, rather than having the converter module 20 that has AC prongs 64 built into the housing of the converter module, as shown in FIG. 1, an AC plug 66 may be provided at the end of an AC cable 68, as shown in FIG. 5. Alternatively, the converter module 20 may be provided with the AC plug 66 and cable 68 as shown in FIG. 5, and have the four prongs 28, 30, 32, 54 described above built directly into the housing of the converter module 20, and thereby eliminating the need for the DC cable 22 and the plug 24, as shown in FIG. 6.

Figure 7:
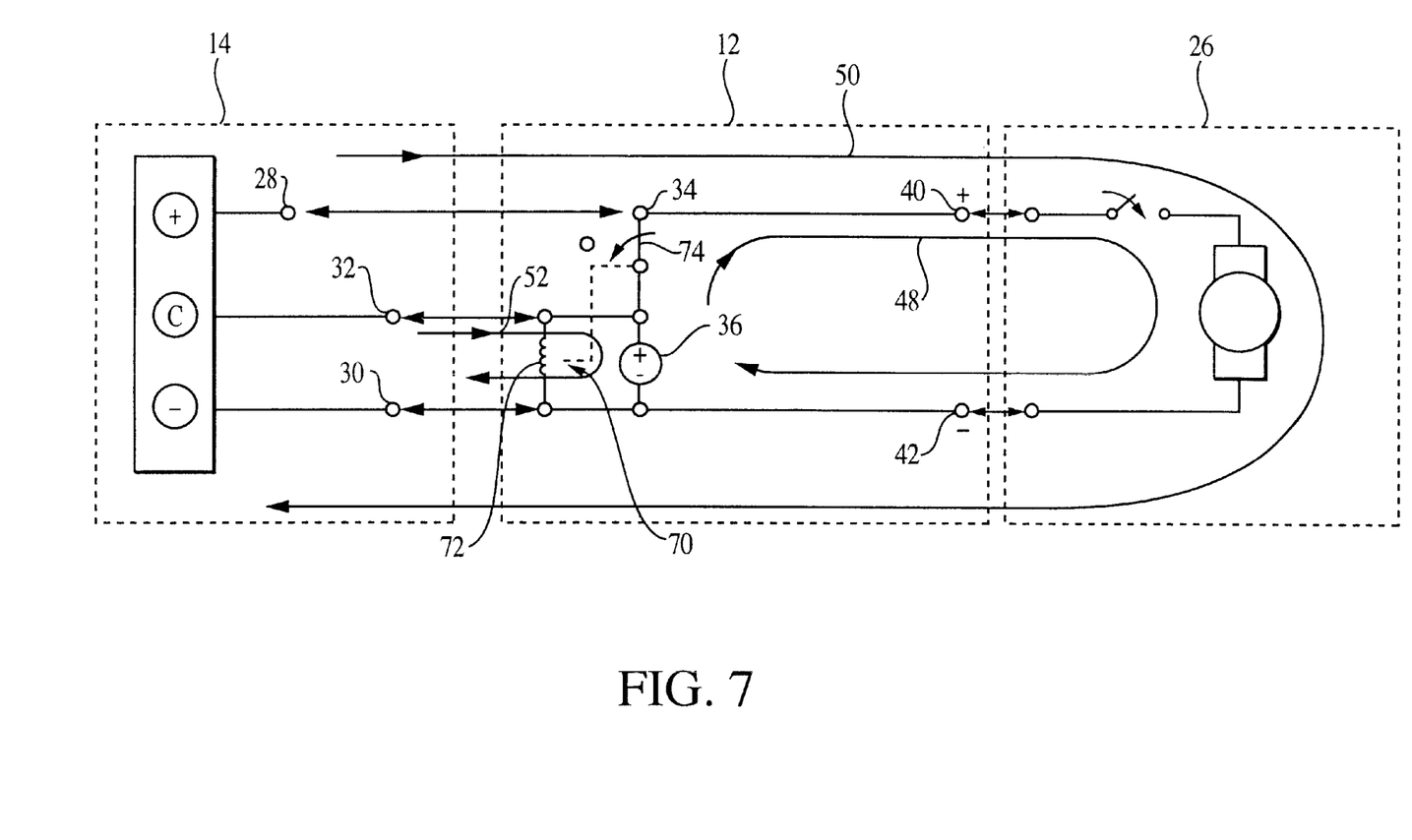

Turning now to FIG. 7, another embodiment of the present invention includes a relay 70 having a coil 72 connected between the charging output 32 and the negative output 30. A contact 74 is also included and is in a normally-closed state when the coil 72 is de-energized, which electrically connects the positive side of the battery pack 36 with the output 40 of the battery pack module 12. Inserting the plug 24 of the power converter unit 14 into the battery pack module 12 automatically charges the coil 72 of the relay 70, causing the relay contact 74 to open and disconnecting the positive side of the battery pack 36 from the output 40 of the battery pack module 12. An instant after the relay contact 74 opens, the positive output 28 of the power converter unit 14 makes electrical contact with the positive output 40 of the battery pack module 12. The flow of current through the circuit when the relay 70 is energized is the same as when the mechanical switch 38 has been activated as described above with respect to FIG. 3. Likewise, the current flow in the state in which the relay 70 is de-energized is the same as when the mechanical switch 38 has been deactivated, as also described above.

As in the case where a mechanical switch 38 is used to disconnect the battery pack 36 from the outputs 40, 42 of the battery pack module 12, the charging output 32 and the positive output 28 of the power converter module 14 should not be simultaneously connected to the positive side of the battery pack 36 to avoid creating an over-voltage condition and damaging the battery pack. The preferred method of accomplishing this is to construct the plug 24 of the power converter module 14 such that the prong of the positive output 28 is shorter than those of the charging output 32 and the negative output 30. This enables the relay 70 to be energized and open the contact 74, so that the battery pack 36 is electrically disconnected from the connection node 34 an instant before the positive output 28 comes in contact with the connection node. It should understood, however, that other means are available which would achieve the same result.

From the foregoing description, it should be understood that an improved power supply system for a power tool has been shown and described which has many desirable attributes and advantages. It automatically allows the tool to be operated directly from a power converter unit without having to remove the battery unit from the tool, and also charges the battery while the tool is being powered by the converter unit. The power supply system is also equipped with a safety feature which prevents the battery from being damaged from an over-voltage condition.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Power supply apparatus for a power tool which is adapted to be powered by a battery source and a corded DC source, said apparatus comprising:

a battery module constructed and adapted to be removably coupled to the power tool and including a battery pack which is adapted to be electrically connected to the power tool for supplying power thereto;

a power converter module for supplying current for charging said battery pack and operating the power tool;

a power plug extending from said power converter module, and constructed and adapted to be connected to said battery module, said plug having a first output for supplying said tool operating current to the power tool and a second output for supplying said battery charging current to said battery pack when said plug is connected to said battery module; and, switching means provided in said battery module and adapted to electrically disconnect said battery pack from the power tool responsive to said power plug being connected to said battery module.

2. The apparatus as defined in claim 1, wherein said battery module includes a connection portion configured and adapted to be removably coupled to the power tool and a housing portion for storing said battery pack.

3. The apparatus as defined in claim 1, wherein said power converter module is adapted to be plugged directly into an AC power source.

4. The apparatus as defined in claim 1, wherein said power converter module is adapted to be connected to an AC power source via an electrical cord.

5. The apparatus as defined in claim 1, wherein said power plug is electrically connected to said power converter module via a power cord.

6. The apparatus as defined in claim 1, wherein said power plug protrudes directly from a housing of said power converter module, and said housing is attached to said battery module when said power plug is connected to said battery module.

7. The apparatus as defined in claim 1, wherein said power converter module includes an AC to DC power converter for supplying said tool operating current, and a battery charger for supplying said battery charging current.

8. Power supply apparatus for a power tool which is adapted to be powered by a battery source and a corded DC source, said apparatus comprising:

a battery module constructed and adapted to be removably coupled to the power tool and including a battery pack which is adapted to be electrically connected to the power tool for supplying power thereto;

a power converter module for supplying current for charging said battery pack and operating the power tool;

a power plug extending from said power converter module, and constructed and adapted to be connected to said battery module, said plug having a first output for supplying said tool operating current to the power tool and a second output for supplying said battery charging current to said battery pack when said plug is connected to said battery module; and, switching means provided in said battery module and adapted to electrically disconnect said battery pack from the power tool responsive to said power plug being connected to said battery module;

said power converter module including an AC to DC power converter for supplying said tool operating current, and a battery charger for supplying said battery charging current;

wherein said first output is adapted to be electrically connected to a positive output of said battery module and said second output is adapted to be electrically connected to a positive terminal of said battery pack when said power plug is connected to said battery module, and said switching means is provided between said positive output and said positive terminal.

9. The apparatus as defined in claim 8, wherein said switching means is in a normally-closed state to maintain said positive terminal of said battery pack in electrical connection with said positive output of said battery module when said power plug is disconnected from said battery module.

10. The apparatus as defined in claim 9, wherein said switching means is activated to open said electrical connection between positive terminal of said battery pack and said positive output of said battery module to prevent said first output from electrically contacting said positive terminal of said battery pack, when said power plug is connected to said battery module.

11. The apparatus as defined in claim 10, wherein said switching means is activated an instant before said second output makes electrical contact with said positive terminal of said battery pack when said power plug is connected to said battery module.

12. The apparatus as defined in claim 11, wherein said switching means includes a mechanical contact which is activated by a switch activating prong provided on said power plug which mechanically opens said contact.

13. The apparatus as defined in claim 12, wherein said switch activating prong is longer than a prong of said first output.

14. The apparatus as defined in claim 11, wherein said switching means includes a relay which is activated by said second output of said power plug.

15. Power supply apparatus for a power tool which is adapted to be powered by a battery source and a corded DC source, comprising:

a battery module constructed and adapted to be removably coupled to the power tool;

at least one battery housed in said battery module and adapted to be electrically connected to the power tool for supplying power to the power tool;

a power converter module adapted to be connected to said battery module and including an AC to DC converter for supplying power to the power tool, and a battery charger for charging said battery; and, switching means provided in said battery module for electrically disconnecting said battery from the power tool when activated responsive to said power converter module being connected to said battery module.

16. Power supply apparatus for a power tool which is adapted to be powered by a battery source and a corded DC source, comprising:

a battery module constructed and adapted to be removably coupled to the power tool;

at least one battery housed in said battery module and adapted to be electrically connected to the power tool for supplying power to the power tool;

a power converter module adapted to be connected to said battery module and including an AC to DC converter for supplying power to the power tool, and a battery charger for charging said battery; and, switching means provided in said battery module for electrically disconnecting said battery from the power tool when activated responsive to said power converter module being connected to said battery module;

wherein said power from said AC to DC converter is output through a first prong and said power from said battery charger is output through a second prong provided on a power plug extending from said power converter module.

17. The apparatus as defined in claim 16, wherein said switching means includes a mechanical contact which is opened by a switch activating prong provided on said power plug, an instant before said power from said AC to DC converter is supplied to the power tool to prevent said power from being supplied to said battery.

18. The apparatus as defined in claim 17, wherein said switch activating prong is longer than said first prong.

19. The apparatus as defined in claim 16, wherein said switching means includes a relay which is activated by said battery charging power from said battery charger to electrically disconnect said battery from said power tool, an instant prior to said power from said AC to DC converter being supplied to the power tool.

20. The apparatus as defined in claim 19, wherein said first prong is shorter than that said second prong.

* * * * *